United States Patent [19]

Crandall et al.

[11] Patent Number: 5,552,984
[45] Date of Patent: Sep. 3, 1996

[54] DIAGNOSTIC SYSTEM FOR COMPLEX SYSTEMS USING VIRTUAL COMPONENTS

[75] Inventors: Danny N. Crandall, Spring Branch; Keith P. Beastrom; Charles M. Cortines, both of San Antonio; Brent B. Thompson, Devine, all of Tex.

[73] Assignee: TRW Inc., Redondo Beach, Calif.

[21] Appl. No.: 122,830

[22] Filed: Sep. 16, 1993

[51] Int. Cl.$^6$ ................................................ G06F 11/277
[52] U.S. Cl. .................... 364/424.03; 364/580; 364/578; 371/48
[58] Field of Search ............................ 364/200, 424.03, 364/424.04, 580, 423, 551.01, 578; 340/500, 52 F; 371/15.1; 73/431; 324/158 R

[56] References Cited

U.S. PATENT DOCUMENTS

| | | | |
|---|---|---|---|
| 4,354,230 | 10/1982 | Murphy et al. | 364/200 |
| 4,412,280 | 10/1983 | Murphy et al. | 364/200 |
| 4,414,539 | 11/1983 | Armer | 340/500 |
| 4,635,030 | 1/1987 | Rauch | 340/52 F |
| 4,943,919 | 7/1990 | Aslin et al. | 364/424.03 |
| 5,023,791 | 6/1991 | Herzberg et al. | 364/424.04 |
| 5,036,479 | 6/1991 | Prednis et al. | 364/580 |
| 5,111,402 | 5/1992 | Brooks et al. | 364/424.04 |
| 5,117,360 | 5/1992 | Hotz et al. | 364/423 |
| 5,131,272 | 7/1992 | Minei et al. | 73/431 |
| 5,161,158 | 11/1992 | Chakravarty et al. | 371/15.1 |
| 5,184,312 | 2/1993 | Ellis | 364/551.01 |
| 5,223,788 | 6/1993 | Andreano et al. | 324/158 R |
| 5,260,874 | 11/1993 | Berner et al. | 364/424.03 |

*Primary Examiner*—Kevin J. Teska
*Assistant Examiner*—Russell W. Frejd
*Attorney, Agent, or Firm*—G. Gregory Schivley; Robert W. Keller

[57] ABSTRACT

A diagnostic method and apparatus according to the invention locates faulty components in complex real systems in which a high level function can be allocated into lower functional levels with each lower functional level including a plurality of functions. Functional level allocation is repeated until functions correspond to line replaceable units, shop replaceable units, or individual circuit components. A virtual model according to the invention can be defined with parallel functional levels and functions using virtual components so that point-to-point comparison of signals generated by the real system functions on each functional level can be made with signals generated by corresponding virtual components to isolate faulty line replaceable units, shop replaceable units, or individual circuit components. Inputs to the virtual components are the same as the real system inputs provided to the real system functions.

34 Claims, 9 Drawing Sheets

DIAGNOSTIC SYSTEM FOR COMPLEX SYSTEMS USING VIRTUAL COMPONENTS

BACKGROUND OF THE INVENTION

1. Technical Field

This invention relates to diagnostic systems and, more particularly, to diagnostic systems incorporating interconnected virtual components which parallel components of a real system, which form a virtual model and which generate virtual output signals for point-to-point comparison with real system component outputs.

2. Discussion

Maintenance diagnostics for complex real systems, for example aircraft navigation, weapons release, engine control, etc. are becoming increasingly important as complexity and uniqueness of each real system increases. For example, an aircraft navigation system may include multiple line replaceable units and each line replaceable unit can contain multiple shop replaceable units.

Ideally, maintenance personnel would be able to service different aircraft types and aircraft systems for each aircraft type. However, in practice, conventional maintenance diagnostics have required maintenance personnel to have significant prior experience and background training thus decreasing a likelihood that one maintenance technician can work on multiple systems.

Conventional diagnostic systems rely heavily upon paper-based technical manuals, other manual procedures, and prior work experience of the technician. Conventional computer diagnostic systems typically automate the paper-based systems. Both conventional diagnostic systems implement rule-based approaches which rely upon a pre-defined body of knowledge stored in an internal database. Effectiveness of these diagnostic systems is related to accuracy of the pre-defined body of knowledge stored in the database, and technician work experience.

Under ideal conditions, a maintenance technician should have an exact duplicate or replica of a system under test. For example, when an aircraft is experiencing failures or malfunctions, a preferred diagnostic system would provide a duplicate operational aircraft running in parallel to the aircraft under test. The maintenance technician would then simply compare signal points to identify faulty components. However such a preferred diagnostic system is not feasible.

Therefore a need exists for a cost effective diagnostic system which relies less on prior work experience of the technician, is easily modifiable, allows one technician to readily work on multiple systems, and simply compares signal points to identify faulty hardware components and shop replaceable units.

A need also exists for a two-level diagnostic system including a first level in which faulty line replaceable units (LRUs) are identified so that the LRU can be removed quickly and replaced to allow the aircraft to return to active service immediately. Subsequently, a second level would identify shop replaceable units (SRUs) in the faulty LRU. The faulty SRU can be replaced and later the LRU can be returned to service. Diagnostics can continue until a faulty individual circuit component or group of components are identified on the faulty SRU.

SUMMARY OF THE INVENTION

A diagnostic method and apparatus according to the invention locates faulty components in complex real systems in which a high level function can be allocated into lower functional levels with each lower functional level including a plurality of functions. Functional level allocation is repeated until functions correspond to line replaceable units. A virtual model according to the invention can be defined with parallel functional levels and functions using virtual components so that point-to-point comparison of signals generated by the real system functions on each functional level can be made with signals generated by corresponding virtual components to isolate faulty line replaceable units. Inputs to the virtual components are the same as the real system inputs provided to the real system functions.

In another feature of the invention, a faulty line replaceable unit includes an $n^{th}$ level function which can be repeatedly allocated into lower functional levels with each lower functional level including a plurality of functions. Functional level allocation is repeated until functions correspond to shop replaceable units. A virtual model according to the invention can be defined with parallel functional levels and functions using virtual components so that point-to-point comparison of signals generated by the line replaceable unit functions on each functional level can be made with signals generated by corresponding virtual components to isolate faulty shop replaceable units. Inputs to the virtual components and the line replaceable unit functions are generated by an actual use simulator.

Other objects, features and advantages will be readily apparent.

BRIEF DESCRIPTION OF THE DRAWINGS

The various advantages of the present invention will become apparent to those skilled in the art after studying the following specification and by reference to the drawings in which.

DESCRIPTION OF THE PREFERRED EMBODIMENT

Figure 1A:
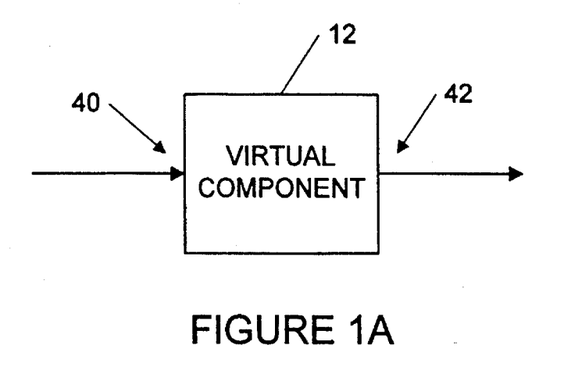
FIG. 1A is a block diagram of a virtual component.
Figure 1B:
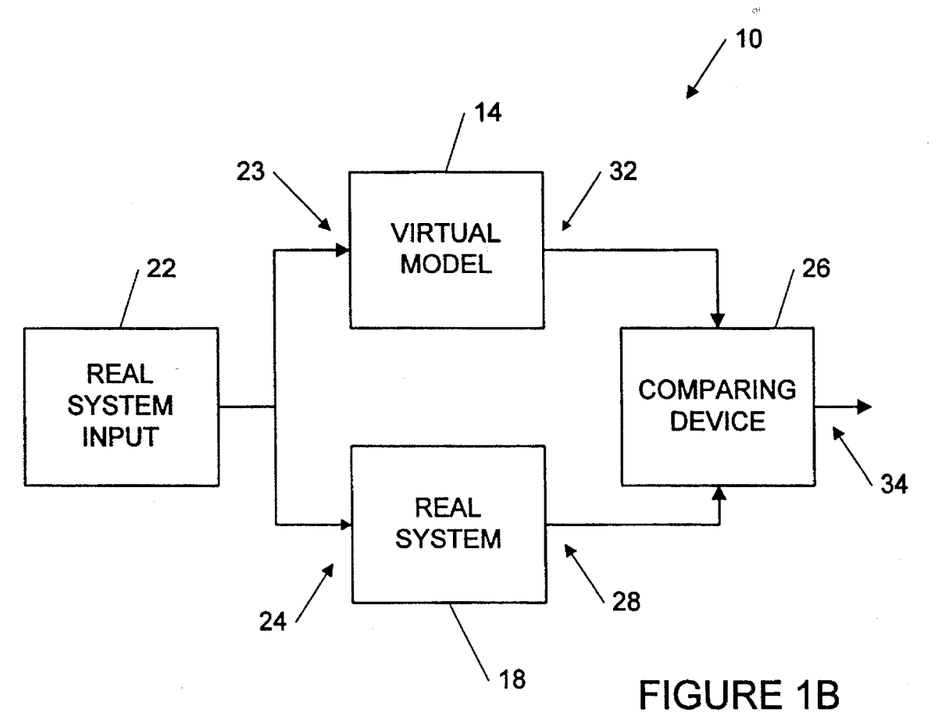
FIG. 1B is a block diagram of a virtual diagnostic system incorporating a virtual model with a plurality of virtual components.

Referring to FIGS. 1A and 1B, a virtual diagnostic system (VDS) 10 integrates a plurality of virtual components 12 to form a virtual model 14. The virtual model 14 parallels a real system 18 under test. The VDS 10 connects real system inputs 22 to an input 24 of the real system 18 and to an input 23 of the virtual model 14. A comparing device 26 compares an output 28 of the real system 18 to an output 32 of the virtual model 14. Diagnostics are performed on an output 34 of the comparing device 26, as will be described below.

The VDS 10 compares the functional behavior of the real system 18 to the functional behavior of the virtual model 14. Assuming that the virtual model 14 adequately models a properly functioning real system (or models a malfunctioning real system), mismatch detected by the comparing device 26 represents functional failure of the real system 18 under test.

The real system 18 can be a high level operation to be tested for example navigation, communications, flight control, fuel monitoring, weapons release, etc. The real system's high level operation can be described as a series or combination of functions which interact with each other through a series of interfaces. The high level operation or function is hereinafter referred to as functional level 0 or F0.

In systems where operator interaction is required, F0 can be defined by operation of switches, keypads for a computer interface, a steering device, etc. which, after being manipulated, causes an expected response. For example, an operator could move a joystick of an aircraft to the left and the expected response could be a combination of movement of a rudder, spoiler, aileron, and/or wing slat. If the real system 18 does not provide the expected response, then a functional failure occurs at F0. The cause of the functional failure at F0 can be failure of a specific component or a group of components.

While the real system 18 is shown as having one input 24 and one output 28, one skilled in the art can appreciate that the real system 18 can have more than one input and/or more than one output. Since the real system 18 has one input 24 and one output 28 in FIG. 1B, the virtual model 14 also has one input 23 and one output 26. As will be described further below, other functional levels of the virtual model 14 will parallel the real system 18. The other functional levels will be defined based upon monitoring points in the real system 18.

To properly identify the cause of the functional failure at F0, the components or group of components must be identified. Initially, F0 must be broken down into sub-level functions called functional level 1 or F1, functional level 2 or F2 . . . to functional level N or FN. Hereinafter, virtual components at functional level N will be referred to an VNA, VNB . . . VNZ (for example V1A, V1B for virtual model functional level 1). Real components at functional level N will be referred to as RNA, RNB . . . RNZ (for example R1A, R1B for real system functional level 1). The notation for both real and virtual components at functional level N will be FNA, FNB . . . FNZ.

Guidelines for choosing and grouping sub-level functions are as follows:

1) each functional level contains a reasonable number or set of distinct virtual components;
2) an input signal to one sub-level virtual component corresponds to, i.e. is the same as, an input signal to a parent virtual component; and
3) an output signal of one sub-level virtual component corresponds to, i.e. is the same as, an output signal of the parent virtual component.

Figure 2:
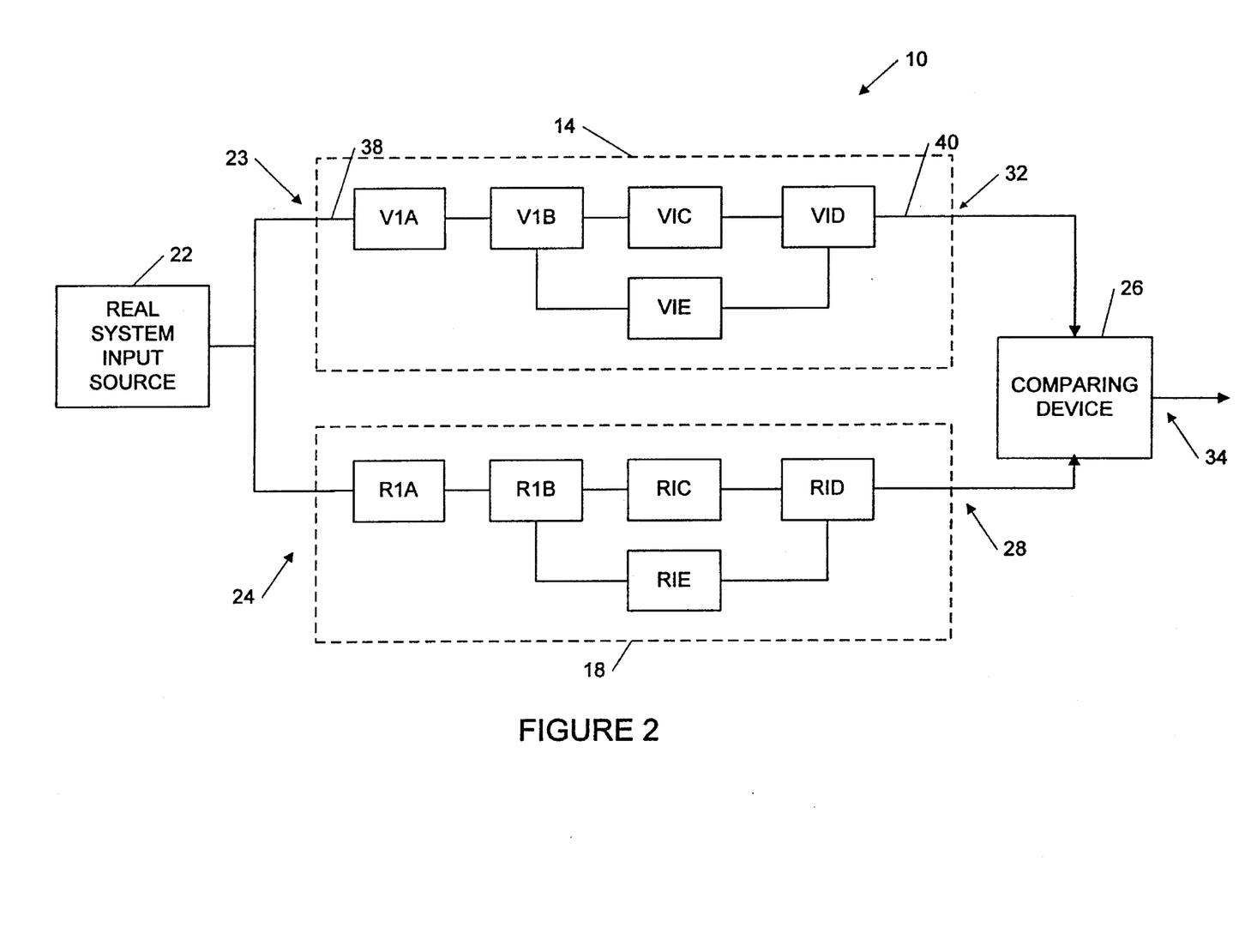
FIG. 2 is a block diagram illustrating an example virtual diagnostic system in greater detail.

Referring to FIG. 2, a second functional level F1 includes virtual components V1A, V1B, V1C, V1D and V1E. Note, that the second functional level shown in FIG. 2 is an example, other configurations will be readily apparent. The virtual components V1A, V1C and V1E each include two interfaces, for example one input and one output. The virtual component V1B includes three interfaces, for example one input and two outputs. The virtual component V1D includes three interfaces, for example two inputs and one output.

To illustrate the above guidelines, the virtual model 14 which corresponds to F0 is defined in FIG. 2 by the virtual components V1A, V1B, V1C, V1D, and V1E. An input 38 to the virtual component V1A is the same as the input 23 to the virtual model 14 or F0. An output 40 of the virtual component V1D is the same as the output 32 of the virtual model 14 or F0.

The structure and design of interfaces of the virtual model must also correspond to the structure of the real system 18. Therefore, the components and groups of components of the real system 18 define the components and grouping of components of the virtual system 14. In other words, the real system 18 including real components R1A, R1B, R1C, R1D, and R1E define the interfaces, the inputs and the outputs of the virtual components of F1.

Functionality of the virtual components is based on on-line models, database information, look-up tables, "real-time" data, and/or off-line models which simulate the performance of the corresponding real component. Off-line models can be complex routines which generate parametric equations for inclusion in the virtual component simulation or independently derive data sets which are embedded in the virtual component.

As can be appreciated the functionality of each of the virtual components corresponds to the functionality of the corresponding real component. Therefore, when the comparing device 26 detects mismatch between the output 32 of the virtual model and the output 28 of the real system at F0, the VDS 10 can monitor and compare outputs of V1A and R1A, V1B and R1B, V1C and R1C, V1D and R1D, and V1E and R1E to begin locating the source of the functional failure.

Figure 3:
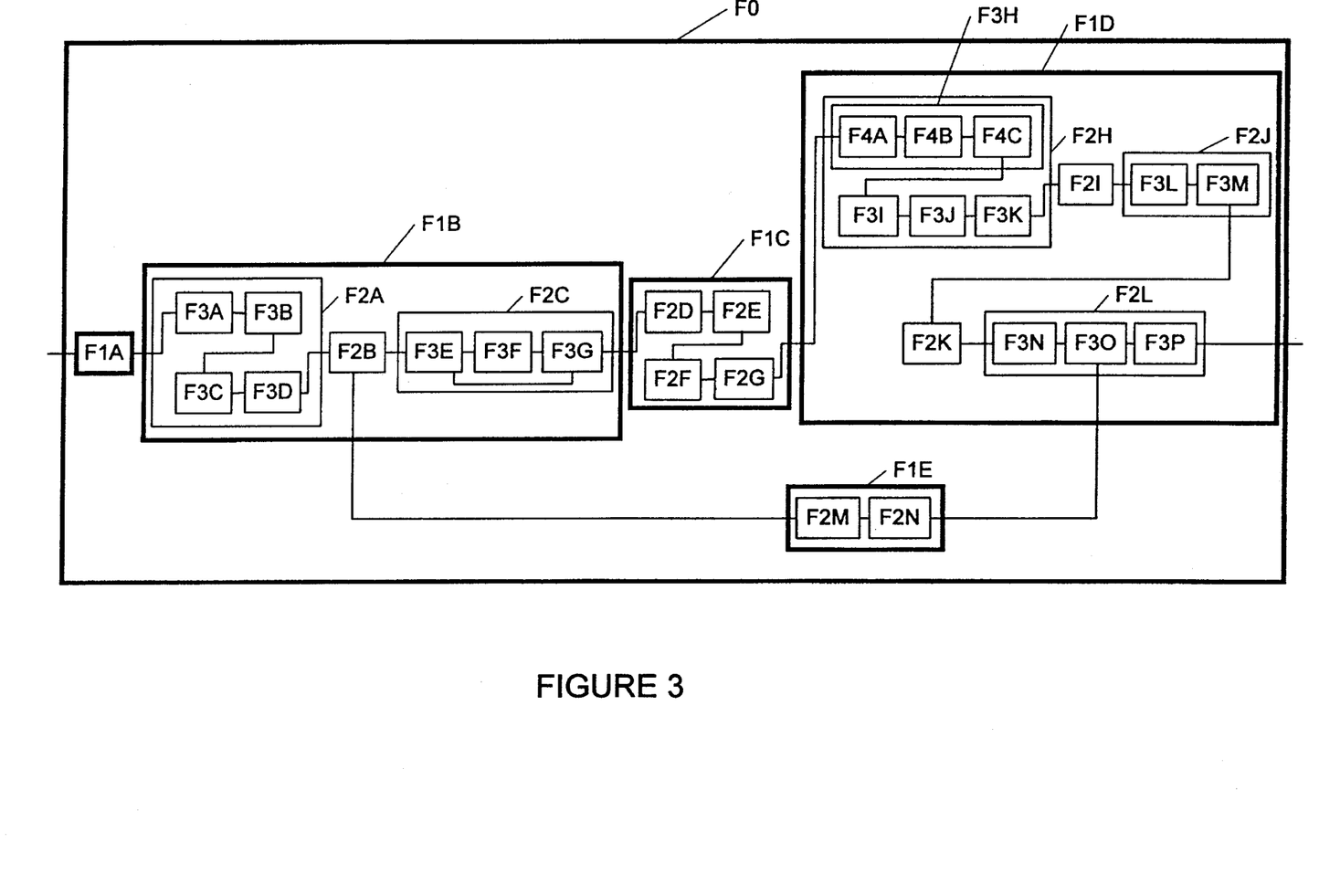
FIG. 3 further illustrates the example of FIG. 2 showing functional allocations of a real system and a virtual model.
Figures 4A, 4B:
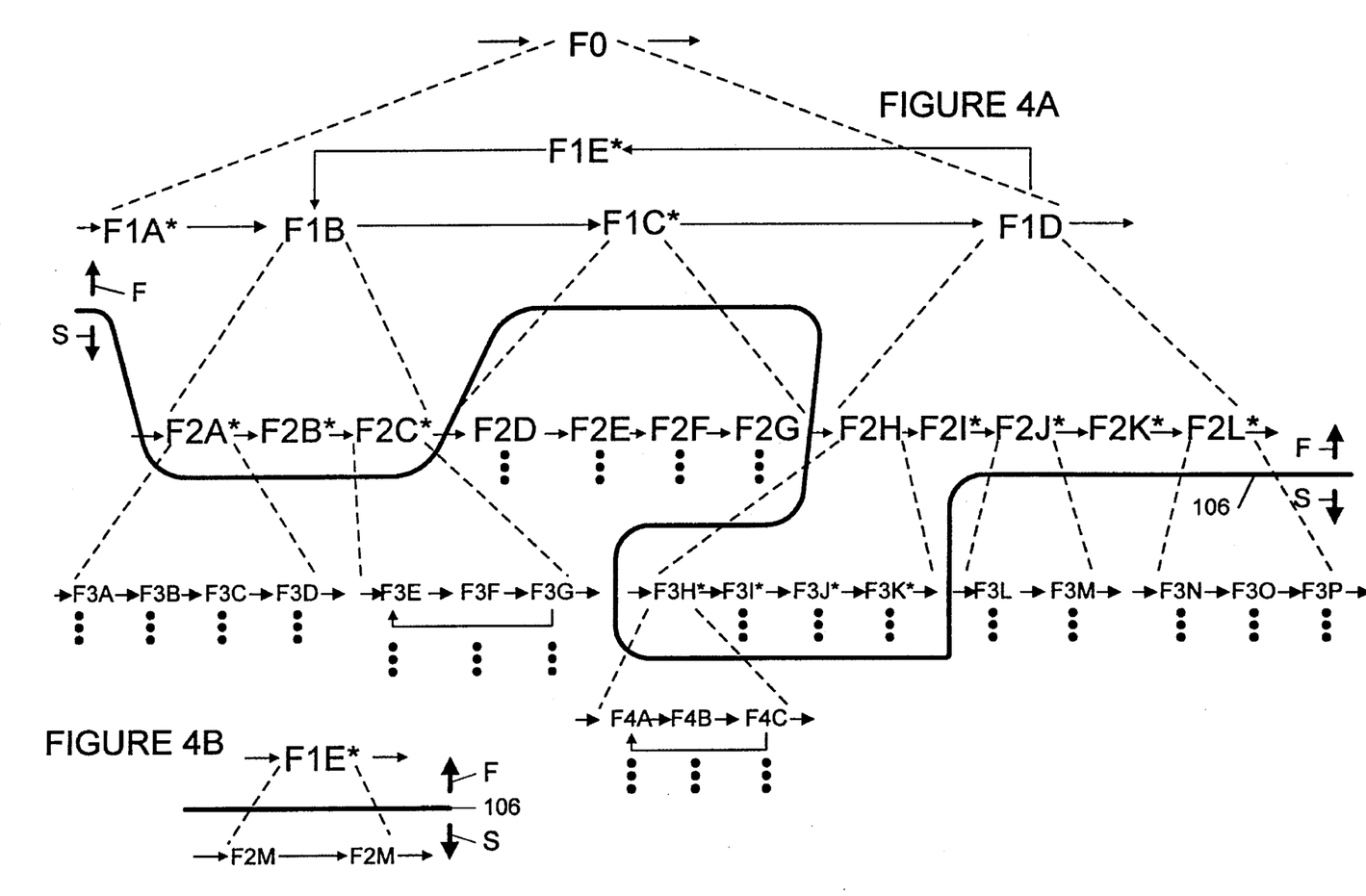
FIG. 4A is a diagram depicting functional levels and their relationship to subordinate functional levels for the example of FIGS. 2 and 3.
FIG. 4B depicts functional blocks subordinate to functional block FIE of FIG. 4A.

Referring to FIGS. 3, 4A and 4B, the real system 18 can further be broken down according to the guidelines above until the virtual components correspond to real components which are specific hardware components, for example, line replaceable units (LRUs) and shop replaceable units (SRUs). The virtual and real components can be derived using FIGS. 3, 4A, 4B, 7 and 8 simply by replacing V for F (e.g. F1A becomes V1A, etc.) and the replacing R for F (e.g. F1A becomes R1A).

When attempting to identify the specific hardware component causing the functional failure, outputs of the real and virtual components are compared until mismatch occurs (or stops occurring). For example, functional failure is found at level F0, outputs of the real and virtual components at level F1 can be compared until mismatch occurs if comparing outputs beginning with V1A and R1A and proceeding consecutively towards V1E and R1E. Alternately, outputs of the real and virtual components at level F1 can be compared until mismatch does not occur if beginning with V1E and R1E and proceeding consecutively towards V1A and R1A.

In the example given in FIGS. 3, 4A and 4B, specific hardware components could correspond to F1A, F2B, F2D, F2E, F2F, F2G, F2I, F2K, F2M, F2N, F3A, F3B, F3C, F3D, F3E, F3F, F3G, F4A, F4B, F4C, F3I, F3J, F3K, F3L, F3M, F3N, F3O, and F3P. Alternatively, additional functional levels represented by ". . ." in FIG. 4A could be defined if desired. For purposes of clarity, functional blocks subordinate to F1E are illustrated at 98 in FIG. 4B.

Assuming that the functional failure is located in F1D (outputs of V1D and R1D are mismatched), the VDS 10 would then begin comparing outputs of F2 functional blocks subordinate to F1D. Assuming that the functional failure is located in F2H (outputs of V2H and R2H are mismatched), the VDS 10 would then begin comparing outputs of F3 functional blocks subordinate to F2H. Assuming that the functional failure is located in F3H (outputs of V3H and R3H are mismatched), then the VDS 10 would then begin comparing outputs of F4 functional blocks subordinate to F3H until eventually the functional failure is isolated in F4B. F4B could correspond to a faulty aileron motor controller which is failing to actuate the aileron correctly. The operator can remove the aileron motor controller and retest at F0 to ensure proper operation and ensure that aileron motor controller is the correct and only failed hardware component.

Figure 5:
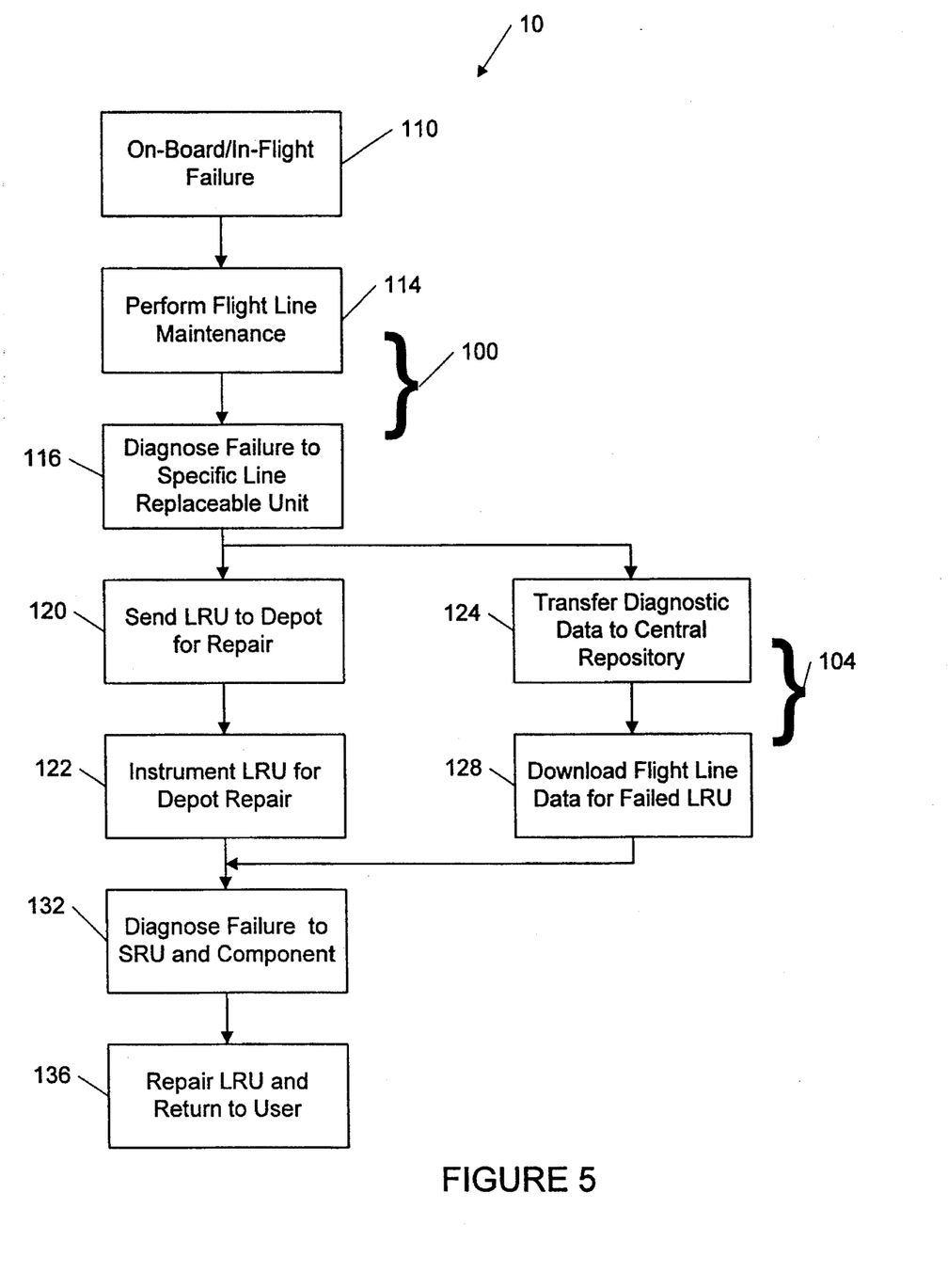
FIG. 5 is a block diagram of a two level maintenance virtual diagnostic system according to the invention.
Figure 6:
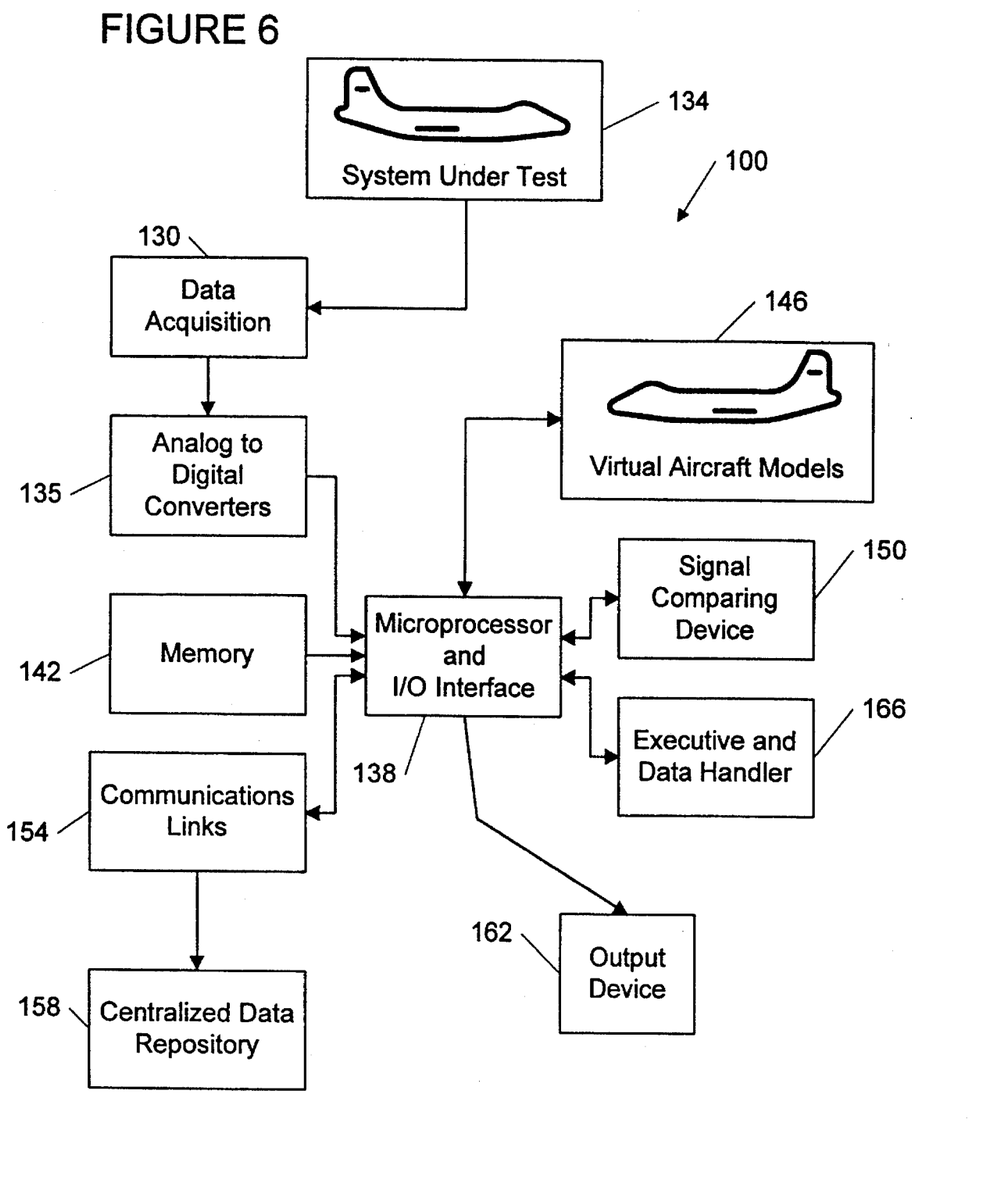
FIG. 6 is a block diagram illustrating additional details of the first level of the first virtual diagnostic system.
Figure 7:
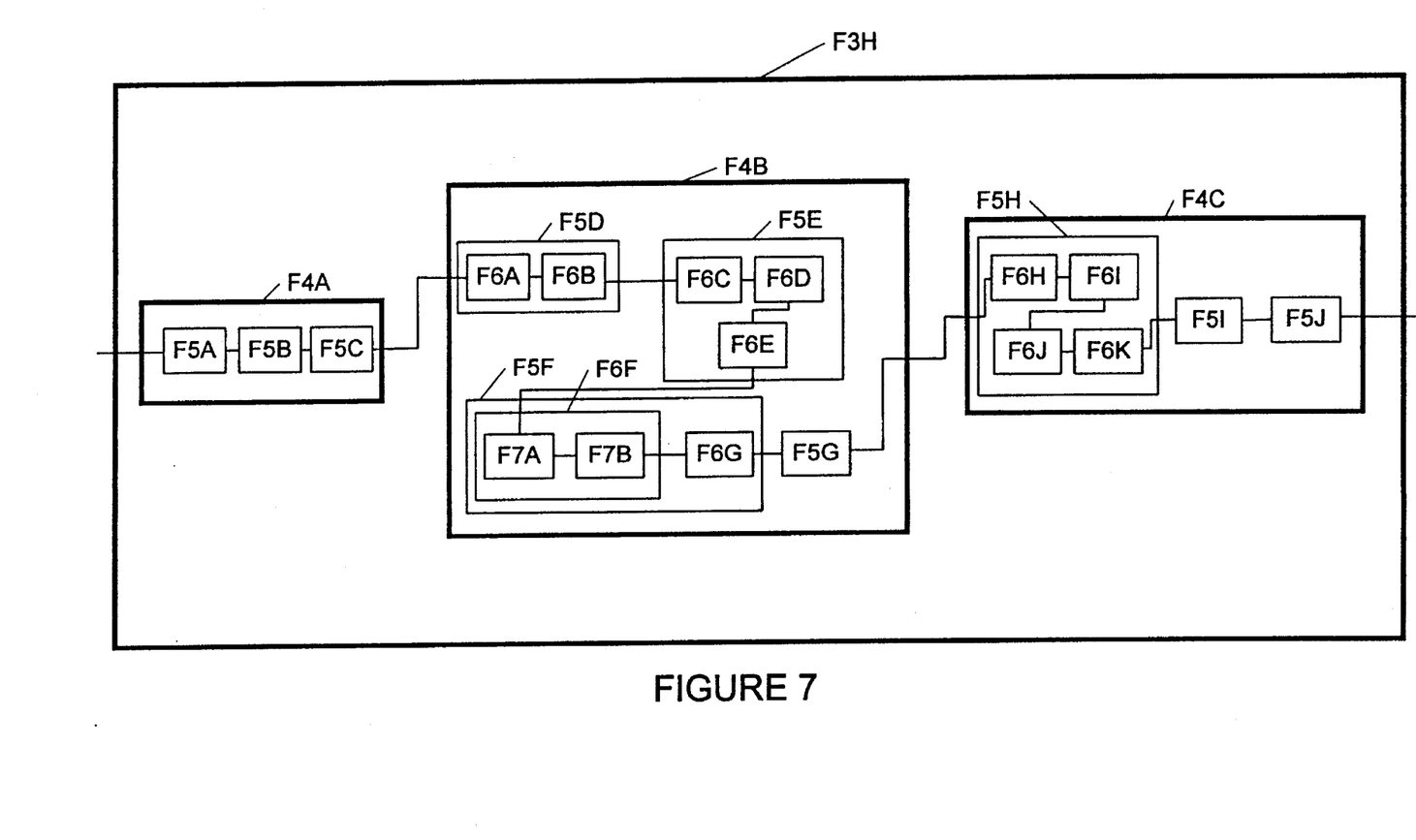
FIG. 7 is a continuation of the example functional allocation of the real system and corresponding virtual model in FIG. 3.

Referring to FIGS. 5–7, an overall block diagram illustrating a two-level virtual diagnostic system 10 is shown in greater detail. While the present invention will be described in reference to aircraft diagnostic maintenance systems, those skilled in the art can appreciate that the virtual diagnostic system has application to a wide variety of other maintenance systems.

FIG. 5 illustrates a two level maintenance approach used by the VDS 10 in diagnosing component failures. In a first or in-use test level 100, failures of line replaceable units (LRUs) are detected while the system under test (SUT), for example an aircraft, is in use. In systems where operator interaction is required, F0 can be defined by operation of switches, keypads for a computer interface, a steering device, etc. which, after being manipulated, causes an expected response. For example, an operator could move a joystick of an aircraft to the left and the expected response could be a combination of movement of a rudder, spoiler, aileron, and/or wing slat. If the real system 18 does not provide the expected response, then a functional failure is identified in block 110. Alternately, an onboard aircraft computer could detect F0 failure.

First level diagnostics are performed in block 114 and a LRU is identified in block 116. The faulty LRU is sent to a depot for repair in block 120 and second level diagnostics are configured in block 122. Data concerning the failed LRU can be transmitted to a central depository in block 124 and actual use data is downloaded to the second level diagnostic system in block 128. A failed SRU is identified and replaced in block 132 and the LRU returned to service in block 136.

To illustrate the first level 100 and continue with the example given in conjunction with FIGS. 3–4, LRUs could correspond to functional blocks F1A, F2A, F2B, F2C, F1C, F3H, F3I, F3J, F3K, F2I, F2J, F2K, F2L, and F1E, each identified with an asterisk in FIGS. 4A and 4B. Line 106 in FIGS. 4A and 4B divide first level testing 100 (see arrow "F") and second level testing 104 (see arrow "S"). Testing in the first level 100 is complete when a faulty LRU is identified. In other words, outputs of RO (real system functional level 0) are initially compared with outputs of V0 (virtual system functional level 0)(hereinafter referred to as "Step 1"). If a faulty output is detected, testing continues with F1.

Outputs of R1A, R1B, R1C, R1D, and R1E (real system functional level 1) are compared with outputs of V1A, V1B, V1C, V1D, and V1E (virtual system functional level 1) until a faulty F1 functional block is located, for example R1D (hereinafter "Step 2"). Since R1A, R1B, R1C have correct outputs, functional blocks below these F1 blocks can be eliminated as the faulty LRU. Note that during first level testing, inputs to the virtual functional blocks are inputs generated in the real system and provided to corresponding real system functional blocks.

Since R1D does not correspond to a LRU component, first level testing continues with F2 blocks which make up the faulty R1D. In other words, since R1D has been identified as the first faulty block, at least one of the functional blocks R2H, R2I, R2J, R2K, and R2L must be faulty. Outputs of R2H, R2I, R2J, R2K and R2L are compared with functional blocks V2H, V2I, V2J, V2K, and V2L until a faulty F2 functional block is identified, for example R2H (hereinafter "Step 3").

Since R2H does not correspond to a LRU component, first level testing continues with F3 blocks which make up the faulty R2H. In other words, since R2H has been identified as a faulty functional block, at least one of the functional blocks R3H, R3I, R3J, and R3K must be faulty. Outputs of R3H, R3I, R3J, and R3K are compared with V3H, V3I, V3J, and V3K until a faulty functional block has been identified, for example R3H (hereinafter "Step 4").

Since R3H corresponds to a LRU, the R3H LRU is replaced and output(s) of F0 (e.g. outputs of R0 compared with outputs of V0) can be subsequently tested to ensure that a proper diagnosis was made, in other words, to ensure that R3H is the correct and only failed functional block.

Referring to FIG. 6, apparatus for performing the first or in-use test level 100 is illustrated. A data acquisition device 130 is connected to a system under test (SUT) 134. The data acquisition device 130 can include a plurality of transducers and should be able to selectively obtain data from inputs and outputs of each real system functional block equal to or functionally above (see line 106) the functional level of each LRU for comparison with outputs of corresponding virtual functional blocks. In other words, the data acquisition device 130 should be able to selectively obtain inputs and outputs of R0, R1A, R1B, R1C, R1D, R1E, R2A, R2B, R2C, R2H, R2I, R2J, R2K, R2L, R3H, R3I, R3J, and R3K.

However, as described above, the data acquisition device 130 need not provide all the inputs and outputs simultaneously. The data acquisition device 130 can selectively monitor the data one functional level at a time, and only some of the outputs of each functional level are required (see data required for each of the Steps 1–4 above). Depending upon the complexity of the SUT, the data acquisition device 130 may simultaneously provide all required inputs and outputs if desired.

The inputs and outputs provided by the data acquisition device 130 are connected to an analog to digital converter 134 which is connected to an input/output interface and microprocessor (hereinafter "microprocessor") 138. Memory 142 which can include RAM, ROM, external storage, etc. is connected to the microprocessor 138. The microprocessor 138 provides the appropriate inputs from the SUT 134 to a virtual model 146. Outputs from the virtual model 146, in addition to the corresponding outputs from the SUT 134, are provided to a signal comparing device 150, which compares an output of the virtual component with the output of a corresponding real system function and provides a mismatch signal if the outputs mismatch.

A communication link 154 can be provided for communication with a centralized data repository 158. An output device 162, for example a display, can also be provided.

Once the microprocessor 138 has determined which LRU is faulty and should be removed, an executive and data handling device 166 can be used while the SUT 134 is undergoing maintenance. The executive and data handling device 166 can provide a series of digitized photographs of the location of the failed LRU, access screws which need to be removed, wiring harness to be removed, etc. to enable relatively inexperienced technicians to remove the failed LRU and install an operational LRU. The SUT 134 can then be quickly returned to active service. The failed and removed LRU is then transferred to a shop where the second level 104 diagnostics are performed.

Figure 8:
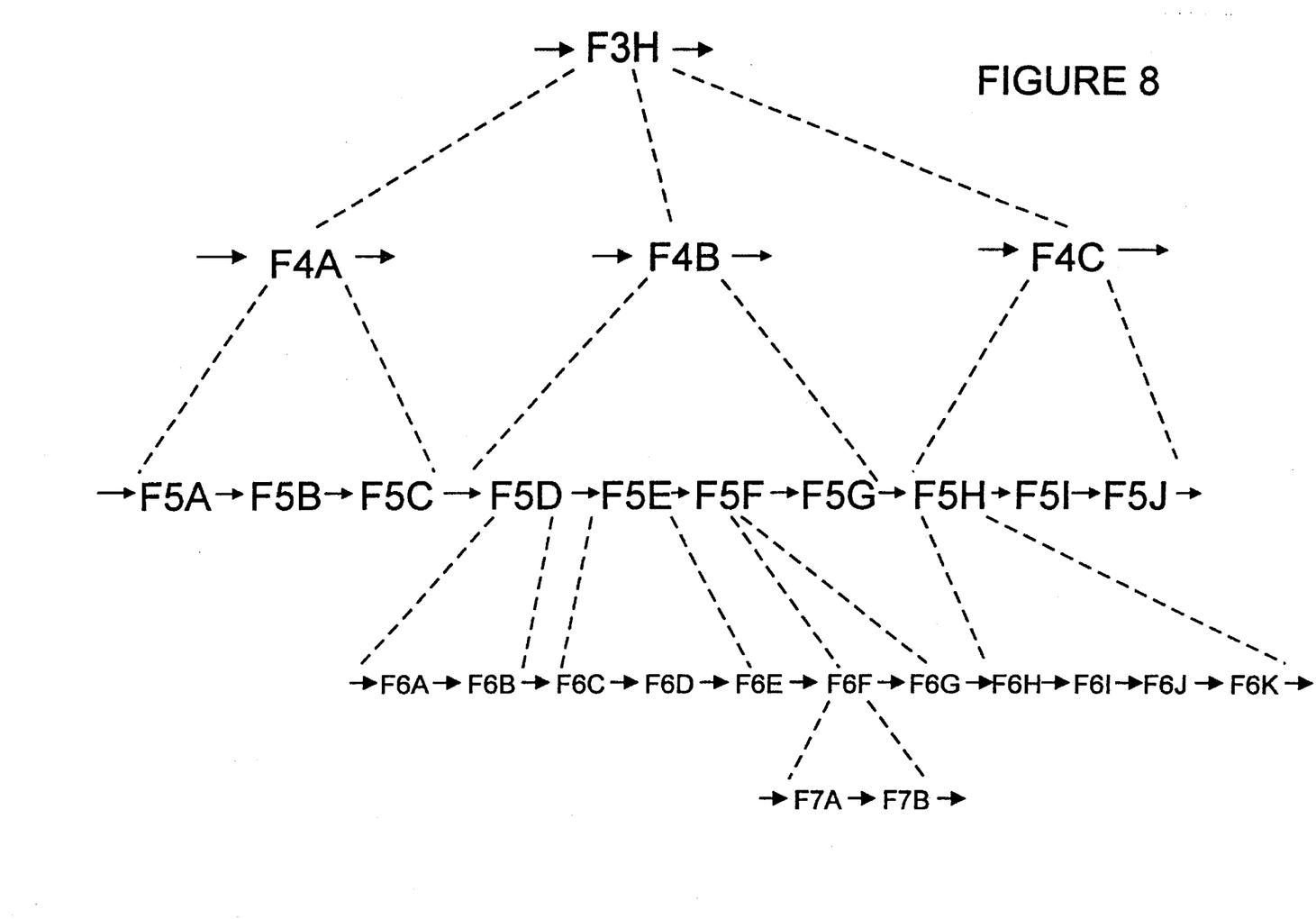
FIG. 8 is a diagram depicting the functional levels and their relationship to subordinate functional levels for the continuation example of FIG. 7.
Figure 9:
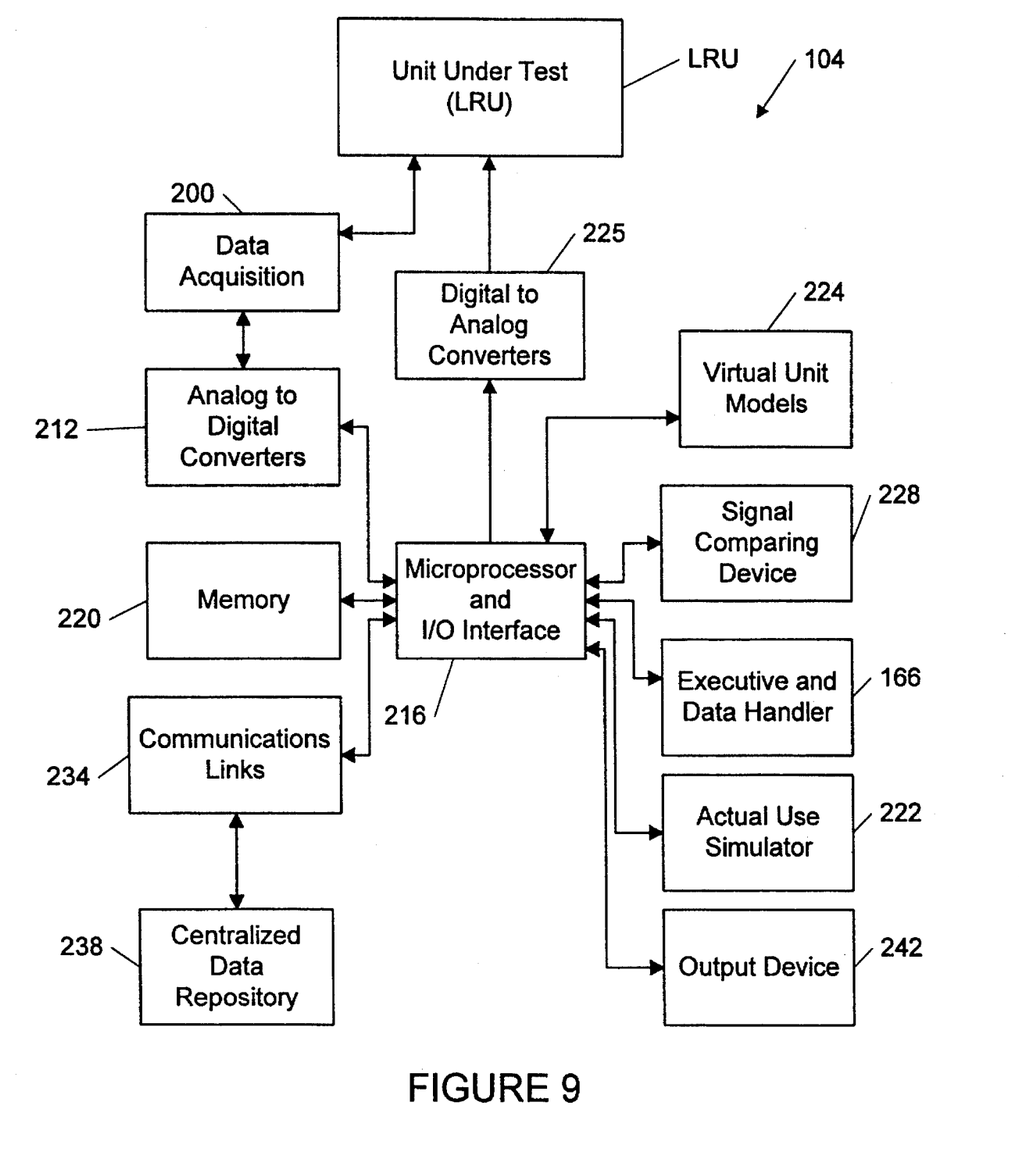
FIG. 9 is a block diagram illustrating additional details of the second level of the virtual diagnostic system.

Referring to FIG. 7–9, apparatus for performing the second level 104 is illustrated. Testing of the second level 104 is analogous to testing of the first level 100 except that simulated or stored actual use data is input to the failed LRU and the virtual model instead of real-time actual data. Testing begins with F4. Simulated data is input to R4A, R4B, and R4C and to V4A, V4B, and V4C. Outputs are compared and a failed functional block is identified. This diagnostic routine is continued until a functional block corresponds to a SRU. The SRU can be a circuit board, an individual circuit component or group of circuit components. In the example given in FIGS. 3–4 and 7–8, F5A, F5B, F5C, F6A, F6B, F6C, F6D, F6E, F7A, F7B, F6G, F6H, F6I, F6J, and F6K correspond to SRUs.

A data acquisition device 200 is connected to the failed LRU F3H. The data acquisition device 200 can include a plurality of transducers and can selectively obtain outputs from real system (and optionally provide inputs to) functional blocks (see arrow "S" in FIG. 4 and FIGS. 7 and 8) below the functional level of the failed LRU for comparison with outputs of corresponding virtual functional blocks. In other words, the data acquisition device 200 must be connected to inputs and outputs of R3H, R4A, R4B, R4C, R5A, R5B, R5C, R5D, R5E, R5F, R5G, R5H, R5I, R5J, R6A, R6B, R6C, R6D, R6E, R6F, R6G, R6H, R6I, R6J, R6K, R7A, and R7B.

However, as with the data acquisition device 130, the data acquisition device 200 need not provide all the outputs simultaneously. The data acquisition device 200 can selectively monitor the data and be connected to one functional level at a time, and not all of the outputs of each functional level are required simultaneously. Depending upon the complexity of the SUT, the data acquisition device 200 may simultaneously provide all required outputs if desired.

The outputs monitored by the data acquisition device 200 are connected to an analog to digital converter 212 which is connected to an input/output interface and microprocessor (hereinafter "microprocessor") 216. Memory 220 which can include RAM, ROM, external storage, etc. is connected to the microprocessor 216. An actual use simulator 222 generates simulation or stored actual use signals which can be routed through the microprocessor 216 to a second virtual model 224. Similarly, the simulation signals can be routed through the microprocessor 216 to a digital to analog (D/A) converter 225 and then to the failed LRU. Other routings and connections will be readily apparent. For example, the actual use simulator 222 can be connected directly to inputs of the real system.

Outputs from the second virtual model 224, in addition to the associated outputs from the failed LRU, are provided to a signal comparing device 228 which compares an output of a virtual component with the output of a corresponding real system function and provides a mismatch signal if the outputs mismatch.

A communication link 234 can be provided for communication with a centralized data repository 238. An output device 242, for example a display, can be provided.

Once the microprocessor 216 has determined which SRU is faulty and should be removed, an executive and data handling device 246 can provide a series of digitized photographs of the location of the failed SRU, access screws which need to be removed, wiring to be removed, etc. to enable relatively inexperienced technicians to remove the failed SRU and install an operational SRU. The repaired LRU can then return to active service.

As can be appreciated, the VDS 10 according to the invention simplifies diagnostic systems for complex systems by providing point-to-point signal comparison. When the real system is modified, the VDS can easily accommodate the modification. The executive and data handling device provides easy step-by-step instructions to allow technicians to service a wide variety of complex systems.

Further, the present invention provides a two level maintenance diagnostic system increasing in-service percentages of complex systems by identifying faulty LRUs during use, removing the LRU and replacing the LRU during the first level. The second level identifies faulty SRUs in the faulty LRU. Other objects, features and advantages will be readily apparent.

While the VDS 10 has been described above in conjunction with an aircraft diagnostic system, those skilled in the art can readily adapt the VDS 10 to other systems requiring diagnostics. For example, the VDS 10 can be used to diagnose failures in a nuclear shutdown system for a nuclear power plant reactor. Operation of a shutdown computer providing the nuclear shutdown system is critical to safe operation of the nuclear power plant. High level operations monitored by the VDS 10 could include the shutdown computer, software run by the shutdown computer, a reactor core, a sensor subsystem, a moderator subsystem and a control and shutdown system. Functional allocation can then be performed until a meaningful level of detail is achieved for each high level operation. Other applications of the VDS 10 will be readily apparent.

The various advantages of the present invention will become apparent to those skilled in the art after a study of the foregoing specification and following claims.

What is claimed is:

1. A method of diagnosing failures in a complex real system including a high level function executed by a plurality of hardware components, wherein said high level function functionally transforms at least one input into at least one output, comprising the steps of:

a) allocating said high level function of said real system into a set of first level functions each functionally transforming at least one input into at least one output, wherein said at least one high level input is provided to said input of one first level function, said at least one high level output is generated by an output of another first level function, and said set of first level functions together provide a functional transformation intended for said high level function;

b) allocating at least one first level function into a set of second level functions each functionally transforming at least one input into at least one output, wherein said at least one first level input is provided to an input of one second level function, said at least one first level output is generated by an output of another second level function, and said set of second level functions together providing a functional transformation intended for said at least one first level function;

c) allocating $n^{th}$ level functions until said $n^{th}$ level functions correspond to readily serviceable hardware components;

d) creating a plurality of virtual model components for simulating each real system level function, wherein said virtual models have inputs, outputs and functional behavior which parallels the level function being simulated;

e) providing said at least one high level input from said real system to a high level virtual model component; and f) comparing said at least one high level output from said high level function of said real system to an output of a high level virtual model component.

2. The diagnostic method of claim 1 further comprising the steps of:

g) providing said first level inputs from said first level functions of said real system to corresponding inputs of first level virtual model components if said high level output from said virtual model does not match said at least one high level output of said high level function; and h) comparing outputs of said first level virtual model components to corresponding outputs of said real system first level functions to identify a faulty first level function.

3. The diagnostic method of claim 2 further comprising the steps of:

i) providing said second level inputs from said real system second level functions subordinate to said faulty first level function to corresponding inputs of second level virtual model components; and j) comparing outputs of said second level virtual model components to corresponding outputs of said real system second level functions to identify a faulty second level function.

4. The diagnostic method of claim 3 further comprising the steps of:

k) providing $n^{th}$ level inputs from said real system $n^{th}$ level functions subordinate to said faulty second level function to corresponding inputs of $n^{th}$ level virtual model components; and l) comparing outputs of said $n^{th}$ level virtual model components to corresponding outputs of said real system $n^{th}$ level functions to identify a faulty $n^{th}$ level function.

5. The diagnostic method of claim 4 further comprising the step of:

m) repeating steps g and h until said faulty $n^{th}$ level function corresponds to said readily serviceable hardware component.

6. The diagnostic method of claim 5 wherein at least one virtual model component models a corresponding real system level function using an on-line model.

7. The diagnostic method of claim 5 wherein at least one virtual model component models a corresponding real system level function using a database.

8. The diagnostic method of claim 5 wherein at least one virtual model component models a corresponding real system level function using look-up tables.

9. The diagnostic method of claim 5 wherein at least one virtual model component models a corresponding real system level function using real-time data.

10. The diagnostic method of claim 5 wherein at least one virtual model component models a corresponding real system level function using off-line models.

11. The diagnostic method of claim 10 wherein said off-line models include complex routines generating parametric equations.

12. The diagnostic method of claim 5 wherein said readily serviceable hardware components are line replaceable units.

13. The diagnostic method of claim 12 further comprising the step of removing the faulty line replaceable unit from said real system.

14. The diagnostic method of claim 13 further comprising the steps of:

n) allocating said faulty $n^{th}$ level function corresponding to said faulty line replaceable unit into a set of $(n+1)^{th}$ level functions each functionally transforming at least one input into at least one output, wherein said input to said at least one faulty $n^{th}$ level is provided to said input of one $(n+1)^{th}$ level function, said output of said at least one faulty $n^{th}$ level is generated by said output of another $(n+1)^{th}$ level function, and said set of $(n+1)^{th}$ level functions together provide a functional behavior intended for said faulty $n^{th}$ level function;

o) allocating at least one $(n+1)^{th}$ level function into a set of $(n+2)^{th}$ level functions each functionally transforming at least one input into at least one output, wherein said at least one $(n+1)^{th}$ level input is provided to said input of one $(n+2)^{th}$ level function, said at least one $(n+1)^{th}$ level output is generated by an output of another $(n+2)^{th}$ level function, and said set of $(n+2)^{th}$ level functions together provide a functional behavior intended for said $(n+1)^{th}$ level function;

p) allocating $(n+m)^{th}$ level functions until said $(n+m)^{th}$ level functions correspond to shop replaceable units;

q) creating a plurality of virtual model components for simulating each level function of said line replaceable unit, wherein said virtual models have inputs, outputs and functional behavior which parallels the level function being simulated;

r) providing an input from an actual use simulator to said real system faulty $n^{th}$ level function and to a corresponding $n^{th}$ virtual model component; and s) comparing said output from said faulty $n^{th}$ level function to the output of the corresponding $n^{th}$ level virtual model component.

15. The diagnostic method of claim 14 further comprising the steps of:

t) providing a plurality of inputs from said actual use simulator to said $(n+1)^{th}$ level functions and said $(n+1)^{th}$ level virtual model components if said output from said faulty $n^{th}$ level does not match an output of said corresponding $n^{th}$ level virtual model component; and u) comparing outputs of said $(n+1)^{th}$ level virtual model components to corresponding outputs of said $(n+1)^{th}$ level function to identify a faulty $(n+1)^{th}$ level function.

16. The diagnostic method of claim 15 further comprising the steps of:

v) providing a plurality of inputs from said actual use simulator to said $(n+2)^{th}$ level functions subordinate to said faulty $(n+1)^{th}$ level function and to corresponding inputs of $(n+2)^{th}$ level virtual model components; and w) comparing outputs of said $(n+2)^{th}$ level virtual model components to corresponding outputs of said $(n+2)^{th}$ level functions to identify a faulty $(n+2)^{th}$ level function.

17. The diagnostic method of claim 16 further comprising the steps of:

x) providing inputs from said actual use simulator to $(n+m)^{th}$ level functions subordinate to said faulty $(n+2)^{th}$ level function and to corresponding inputs of $(n+m)^{th}$ level virtual model components; and y) comparing outputs of said $(n+m)^{th}$ level virtual model components to corresponding outputs of said $(n+m)^{th}$ level functions to identify a faulty $(n+m)^{th}$ level function.

18. The diagnostic method of claim 17 further comprising the step of:

z) repeating steps x and y until a faulty $(n+m)^{th}$ level function corresponds to a faulty shop replaceable unit.

19. A method of maintaining an aircraft by diagnosing failures using a two level approach, wherein the aircraft includes a high level function executed by a plurality of hardware components, wherein said high level function functionally transforms at least one input into at least one output, and wherein the first maintenance level comprises the steps of:

a) allocating said high level function of said real system into a set of first level functions each functionally transforming at least one input into at least one output, wherein said at least one high level input is provided to said input of one first level function, said at least one high level output is generated by an output of another first level function, and said set of first level functions together provide a functional transformation intended for said high level function;

b) allocating at least one first level function into a set of second level functions each functionally transforming at least one input into at least one output, wherein said at least one first level input is provided to an input of one second level function, said at least one first level output is generated by an output of another second level function, and said set of second level functions together providing a functional transformation intended for said at least one first level function;

c) allocating $n^{th}$ level functions until said $n^{th}$ level functions correspond to readily serviceable hardware components;

d) creating a plurality of virtual model components for simulating each real system level function, wherein said virtual models have inputs, outputs and functional behavior which parallels the level function being simulated;

e) providing said at least one high level input from said real system to a high level virtual model component;

f) comparing said at least one high level output from said high level function of said real system to an output of a high level virtual model component;

g) providing said first level inputs from said first level functions of said real system to corresponding inputs of first level virtual model components if said high level output from said virtual model does not match said at least one high level output of said high level function;

h) comparing outputs of said first level virtual model components to corresponding outputs of said real system first level functions to identify a faulty first level function;

i) providing said second level inputs from said real system second level functions subordinate to said faulty first level function to corresponding inputs of second level virtual model components;

j) comparing outputs of said second level virtual model components to corresponding outputs of said real system second level functions to identify a faulty second level function;

k) providing $n^{th}$ level inputs from said real system $n^{th}$ level functions subordinate to said faulty second level function to corresponding inputs of $n^{th}$ level virtual model components;

l) comparing outputs of said $n^{th}$ level virtual model components to corresponding outputs of said real system $n^{th}$ level functions to identify a faulty $n^{th}$ level function; and m) repeating steps g and h until said faulty $n^{th}$ level function corresponds to said readily serviceable hardware component.

20. The method of maintaining an aircraft of claim 19 wherein said readily serviceable hardware components are line replaceable units.

21. The method of maintaining an aircraft of claim 20 further comprising the step of removing the readily serviceable hardware component from said real system.

22. The method of maintaining an aircraft of claim 21 wherein the second maintenance level comprises the steps of:

n) allocating said faulty $n^{th}$ level function corresponding to said faulty line replaceable unit into a set of $(n+1)^{th}$ level functions each functionally transforming at least one input into at least one output, wherein said input to said at least one faulty $n^{th}$ level is provided to said input of one $(n+1)^{th}$ level function, said output of said at least one faulty $n^{th}$ level is generated by said output of another $(n+1)^{th}$ level function, and said set of $(n+1)^{th}$ level functions together provide a functional behavior intended for said faulty $n^{th}$ level function;

o) allocating at least one $(n+1)^{th}$ level function into a set of $(n+2)^{th}$ level functions each functionally transforming at least one input into at least one output, wherein said at least one $(n+1)^{th}$ level input is provided to said input of one $(n+2)^{th}$ level function, said at least one $(n+1)^{th}$ level output is generated by an output of another $(n+2)^{th}$ level function, and said set of $(n+2)^{th}$ level functions together provide a functional behavior intended for said $(n+1)^{th}$ level function;

p) allocating $(n+m)^{th}$ level functions until said $(n+m)^{th}$ level functions correspond to shop replaceable units;

q) creating a plurality of virtual model components for simulating each level function of said line replaceable unit, wherein said virtual models have inputs, outputs and functional behavior which parallels the level function being simulated;

r) providing an input from an actual use simulator to said faulty $n^{th}$ level function and to a corresponding $n^{th}$ virtual model component;

s) comparing said output from said faulty $n^{th}$ level function to the output of the corresponding $n^{th}$ level virtual model component;

t) providing a plurality of inputs from said actual use simulator to said $(n+1)^{th}$ level functions and said $(n+1)^{th}$ level virtual model components if said output from said faulty $n^{th}$ level does not match an output of said corresponding $n^{th}$ level virtual model component;

u) comparing outputs of said $(n+1)^{th}$ level virtual model components to corresponding outputs of said $(n+1)^{th}$ level function to identify a faulty $(n+1)^{th}$ level function;

v) providing a plurality of inputs from said actual use simulator to said $(n+2)^{th}$ level functions subordinate to said faulty $(n+1)^{th}$ level function and to corresponding inputs of $(n+2)^{th}$ level virtual model components;

w) comparing outputs of said $(n+2)^{th}$ level virtual model components to corresponding outputs of said $(n+2)^{th}$ level functions to identify a faulty $(n+2)^{th}$ level function;

x) providing inputs from said actual use simulator to $(n+m)^{th}$ level functions subordinate to said faulty $(n+2)^{th}$ level function and to corresponding inputs of $(n+m)^{th}$ level virtual model components;

y) comparing outputs of said $(n+m)^{th}$ level virtual model components to corresponding outputs of said $(n+m)^{th}$ level functions to identify a faulty $(n+m)^{th}$ level function; and z) repeating steps x and y until a faulty $(n+m)^{th}$ level function corresponds to said shop replaceable unit.

23. In a complex real system including a high level function functionally transforming at least one input into at least one output, wherein said high level function is composed of a plurality of first level functions each functionally transforming at least one input into at least one output, said at least one input of said high level function is provided to one first level function, said at least one output is generated by another first level function, and said functional transformation intended for said high level function is generated by said set of first level functions, wherein at least one first level function is composed of a set of second level functions each functionally transforming at least one input into at least one output, said input to said at least one first level function is provided to one second level function, said at least one output of said first level function is generated by another second level function, and said functional transformation intended for said first level function is generated by said set of second level functions, and wherein said at least one second level function can be allocated to $n^{th}$ level functions until said each level function corresponds to a readily serviceable hardware component, a diagnostic system comprising:

data acquisition means for obtaining inputs to and outputs of said real system level functions;

virtual model means coupled to said data acquisition means for simulating intended functional transformations of each real system level function when provided corresponding inputs and for generating at least one intended output; and comparing means for comparing intended outputs of each functional level of said virtual model means and actual outputs of corresponding functional levels of said real system to identify faulty hardware components, wherein said virtual model means initially compares said high level function, then said first level functions, then said second level functions subordinate to a faulty first level function, and then $n^{th}$ level functions subordinate to a faulty second level function until a faulty level function corresponds to said readily serviceable hardware component.

24. The diagnostic system of claim 23 wherein said data acquisition means includes at least one transducer.

25. The diagnostic system of claim 24 wherein said data acquisition means includes an analog to digital converter.

26. The diagnostic system of claim 23 wherein said virtual model means includes a microprocessor and memory means for storing and executing on-line models.

27. The diagnostic system of claim 23 further including:

display means coupled to said microprocessor and memory means for graphically depicting a location of said faulty hardware component and for generating step-by-step removal instructions.

28. The diagnostic system of claim 27 wherein said step-by-step instructions are pictorial.

29. A diagnostic system for a faulty line replaceable unit having an $n^{th}$ level function which functionally transforms at least one input into at least one output, wherein said $n^{th}$ level function is composed of a plurality of $(n+1)^{th}$ level functions each functionally transforming at least one input into at least one output, said at least one input of said $n^{th}$ level function is provided to one $(n+1)^{th}$ level function, said at least one output of said faulty $n^{th}$ level function is generated by another $(n+1)^{th}$ level function, and said functional transformation intended for said $n^{th}$ level function is generated by said set of $(n+1)^{th}$ level functions, wherein at least one $(n+1)^{th}$ level function is composed of a set of $(n+2)^{th}$ level functions each functionally transforming at least one input into at least one output, said input to said at least one $(n+1)^{th}$ level function is provided to one $(n+2)^{th}$ level function, said at least one output of said $(n+1)^{th}$ level function is generated by another $(n+2)^{th}$ level function, and said function transformation intended for said $(n+1)^{th}$ level function is provided by said set of $(n+2)^{th}$ level functions, and where in said at least one $(n+2)^{th}$ level function can be allocated to $(n+m)^{th}$ level functions until said level functions correspond to shop replaceable units, a diagnostic system comprising:

use simulation means coupled to said line replaceable unit for generating a plurality of simulated input signals;

a virtual model coupled to said simulation means and including virtual components corresponding to said line replaceable unit level function, wherein each virtual component functionally transforms at least one simulated input into at least one intended output;

data acquisition means coupled to said line replaceable unit for obtaining outputs of each line replaceable unit level function;

comparing means coupled to said virtual model means and said data acquisition means for comparing outputs of said line replaceable unit function levels to intended outputs of corresponding virtual components to identify a faulty shop replaceable unit, wherein said comparing means initially compares said $n^{th}$ level function, then said $(n+1)^{th}$ level functions, then said $(n+2)^{th}$ level functions subordinate to a faulty $(n+1)^{th}$ level function, and then $(n+m)^{th}$ level functions subordinate to a faulty $(n+2)^{th}$ level function until a faulty level function corresponds to said faulty shop replaceable unit.

30. The diagnostic system of claim 29 wherein said data acquisition means includes at least one transducer.

31. The diagnostic system of claim 30 wherein said data acquisition means includes an analog to digital converter.

32. The diagnostic system of claim 29 wherein said virtual model means includes a microprocessor and memory means for storing and executing on-line models.

33. The diagnostic system of claim 29 further including:

display means connected to said microprocessor and memory means for graphically depicting a location of said faulty hardware component and for generating step-by-step removal instructions.

34. The diagnostic system of claim 33 wherein said step-by-step instructions are pictorial.

\* \* \* \* \*